UNITED STATES PATENT OFFICE.

CHRISTIAN EMIL BICHEL, OF HAMBURG, GERMANY.

EXPLOSIVE.

No. 896,887.　　　　Specification of Letters Patent.　　　　Patented Aug. 25, 1908.

Application filed August 30, 1906. Serial No. 332,672.

*To all whom it may concern:*

Be it known that I, CHRISTIAN EMIL BICHEL, a citizen and resident of Hamburg, in the German Empire, have invented certain new and useful Improvements in Explosives, of which the following is a specification.

It is known that tri-nitro-toluene both in crystallized and in melted form, as also in compressed form on account of its various advantageous properties is specially well adapted for charging shells, mines, torpedoes and the like. An objection is experienced however, especially in the use of such explosive in shells which have no bottom screw and the orifice of which is narrower than the cavity, that the introduction of the explosive in compressed form is impossible without leaving interstices, is difficult in molten form, and can be effected in the case of the crystalline form only with the formation of dust, so that the charging density is small, a cubic centimeter weighing from .80 to 1.00 gram. It is therefore a felt want that while maintaining the valuable properties of the tri-nitro-toluene, that is especially on account of its insensitiveness to shocks and blows, to alter its form so that the material to be introduced is in the state of plastic lumps which can be readily introduced and stamped down firmly. A second consideration to be taken into account is that a slight loss in energy should result, while it must be regarded as advantageous for the working of mines if the rate of detonation is somewhat reduced.

In order to solve the problem I add to the tri-nitro-toluene an olio-resin or resins in solid or liquid form, either alone or in conjunction with bi-nitro-toluene, in such wise that with the use of liquid resin, such for instance as copaiba balsam, the crystalline tri-nitro-toluene, with or without warming, is worked in suitable mixing machines into a plastic explosive that detonates well. Similarly I may employ resins which are dissolved in liquid hydrocarbon, such for instance, as larch turpentine. Finally, I may also combine liquid or solid resins, such for instance as liquid storax or gum-benjamin, with so-called liquid bi-nitro-toluene, in order when mixed in this form with tri-nitro-toluene to produce a plastic explosive.

In order to obtain a material of high chemical stability it is essential to use a resin which is not easily oxidized under ordinary atmospheric conditions. Venetian turpentine and copaiba balsam, for example, are not oxidizable under ordinary conditions, and a mixture made with either ingredient will stand Abel's heat test. In all these cases the plasticity can be further increased by adding suitable quantities of collodion wool, in order to obtain a gelatinous plasticity.

The above-named bodies are mixed with or without an addition of collodion wool, first without tri-nitro-toluene, and are stirred for some time while warming in a suitable mixing vessel, for instance in a Werner and Pfleiderer mixing trough, so that they form a thick liquid. The latter is then added to the tri-nitro-toluene and again stirred in the mixing vessel until a homogenous crumbling or comparatively dry plastic mass is produced.

For this process any resin is suitable, either solid or liquid, and also the so-called liquid bi-nitro-toluene, but it is advisable to clean all the materials carefully. The collodion wool which is to bring about the plasticity can be added to the mixture either at the commencement or afterwards when the mixture has been more thoroughly warmed. The finished product will be known to be in rightly selected proportions by the crumbling plastic mass not adhering to the tools which are used to charge the shells, mines and torpedoes, it can be stamped down well without leaving interstices, and has a considerable density, a cubic centimeter weighing about 1.5 grams. So long as the tri-nitro-toluene forms the main constituent of the explosive, the mixing proportions may be so chosen that the explosive power of the same will be only slightly less than that of the pure tri-nitro-toluene.

Examples may be given as follows:—

(*a*) 87% tri-nitro-toluene, 13% copaiba balsam.

(*b*) 87% tri-nitro-toluene, 12% copaiba balsam, 1% collodion wool.

(*c*) 85% tri-nitro-toluene, 15% larch turpentine.

(*d*) 85% tri-nitro-toluene, 14% larch turpentine, 1% collodion wool.

(*e*) 85% tri-nitro-toluene, 5% liquid storax, 10% liquid bi-nitro-toluene.

(*f*) 85% tri-nitro-toluene, 4.5% liquid storax, 0.5% collodion wool, 10% liquid bi-nitro-toluene.

(*g*) 85% tri-nitro-toluene, 5% gum-benjamin, 10% liquid bi-nitro-toluene.

(h) 85% tri-nitro-toluene, 4.5% gum benjamin, 0.5% collodion wool, 10% liquid bi-nitro-toluene.

I claim—

1. A plastic explosive comprising tri-nitro-toluene and a resin non-oxidizable under ordinary atmospheric conditions in substantially the described proportions.

2. A plastic explosive comprising tri-nitro-toluene and an oleo-resin in substantially the described proportions.

3. A plastic explosive comprising tri-nitro-toluene an oleo-resin and bi-nitro-toluene in substantially the described proportions.

4. A plastic explosive comprising tri-nitro-toluene, an oleo-resin, bi-nitro-toluene and collodion wool in substantially the described proportions.

5. An explosive comprising tri-nitro-toluene and a liquid oleo-resin in substantially the described proportions.

6. An explosive comprising tri-nitro-toluene, a liquid oleo-resin and bi-nitro-toluene in substantially the described proportions.

7. An explosive comprising tri-nitro-toluene, a liquid oleo-resin, bi-nitro-toluene and collodion wool, in substantially the described proportions.

8. An explosive comprising a large percentage of tri-nitro-toluene and a smaller percentage of an oleo-resin capable of rendering the tri-nitro-toluene plastic.

9. An explosive comprising a large percentage of tri-nitro-toluene, a smaller percentage of an oleo-resin capable of rendering the tri-nitro-toluene plastic, and a still smaller percentage of a gelatinizing compound.

10. An explosive comprising over eighty percent. tri-nitro-toluene, bi-nitro-toluene, an oleo-resin capable of rendering tri-nitro-toluene plastic, and collodion wool to give a gelatinous consistency to the mixture.

CHRISTIAN EMIL BICHEL.

Witnesses:
 MAX A. G. LEMCKE,
 IDA HAFERMANN.